(12) United States Patent  
Bohn et al.

(10) Patent No.: US 6,312,012 B1  
(45) Date of Patent: Nov. 6, 2001

(54) STEERING WHEEL WITH INTEGRATED GAS BAG

(75) Inventors: Stephan Bohn, Goldbach; Ralph Frisch, Mömbris, both of (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 09/272,281

(22) Filed: Mar. 19, 1999

(30) Foreign Application Priority Data

Mar. 23, 1998 (DE) .......................................... 298 05 207 U

(51) Int. Cl.[7] .................................................. B60R 21/16
(52) U.S. Cl. .................. 280/731; 280/728.1; 280/728.3; 200/61.54; 200/61.55
(58) Field of Search ............................... 280/731, 728.1, 280/728.3; 200/61.54, 61.55

(56) References Cited

U.S. PATENT DOCUMENTS

| | | | |
|---|---|---|---|
| 5,023,412 | * | 6/1991 | Ishida ................................. 200/61.54 |
| 5,228,362 | * | 7/1993 | Chen et al. ........................... 280/731 |
| 5,235,146 | * | 8/1993 | Suzuki ................................. 280/731 |
| 5,303,952 | * | 4/1994 | Shermetaro et al. ................. 280/731 |
| 5,327,796 | * | 7/1994 | Ernst et al. .......................... 280/731 |
| 5,333,897 | * | 8/1994 | Landis et al. ........................ 280/731 |
| 5,356,173 | * | 10/1994 | Hongou et al. .................. 280/731 X |
| 5,410,114 | * | 4/1995 | Furuiet et al. ....................... 280/731 |
| 5,431,438 | * | 7/1995 | Manabe ............................... 280/731 |
| 5,480,184 | * | 1/1996 | Young ................................. 280/731 |
| 5,508,482 | * | 4/1996 | Martin et al. ..................... 200/61.55 |
| 5,597,177 | * | 1/1997 | Matsuura ............................. 280/731 |
| 5,624,130 | * | 4/1997 | Ricks .................................. 280/731 |
| 5,627,352 | * | 5/1997 | Suzuki ............................. 200/61.54 |
| 5,655,789 | * | 8/1997 | Kreuzer .............................. 280/731 |
| 5,685,557 | * | 11/1997 | Persson et al. ...................... 280/731 |
| 5,741,025 | * | 4/1998 | Meyer et al. ........................ 280/731 |
| 5,762,359 | * | 6/1998 | Webber et al. ...................... 280/731 |
| 5,829,777 | * | 11/1998 | Sakurai et al. ...................... 280/731 |
| 5,873,596 | * | 2/1999 | Kantoh et al. ...................... 280/731 |
| 5,899,487 | * | 5/1999 | Fischer ............................... 280/731 |
| 5,927,746 | * | 7/1999 | Komiya et al. ..................... 280/731 |
| 5,931,492 | * | 8/1999 | Mueller et al. .................. 200/61.55 |
| 5,971,429 | * | 10/1999 | Bramberger et al. ............. 280/731 |
| 6,062,592 | * | 5/2000 | Sakurai et al. ................. 280/731 X |
| 6,095,552 | * | 8/2000 | Hosoi et al. ........................ 280/731 |

FOREIGN PATENT DOCUMENTS

2270657 * 3/1994 (GB) .................................. 280/731

* cited by examiner

*Primary Examiner*—Lanna Mai  
*Assistant Examiner*—Toan C To  
(74) *Attorney, Agent, or Firm*—Tarolli, Sundheim, Covell, Tummino & Szabo L.L.P.

(57) ABSTRACT

A steering wheel has a skeleton with a foamed sheathing, a hub, spokes and a steering wheel rim. A gas bag module is inserted in a central recess of the steering wheel. The gas bag module has a cover cap at the side facing the driver. For actuating a horn switch the module is movable in the direction of the steering wheel axis relative to the steering wheel. A movement gap is formed between the cover cap and the foamed sheathing. Mounting studs on the skeleton extend parallel to the steering wheel axis. The positioning of the mounting studs is defined by the foamed sheathing. The mounting studs have free ends which are slidingly accommodated in guide recesses provided in the cover cap.

19 Claims, 3 Drawing Sheets

US 6,312,012 B1

STEERING WHEEL WITH INTEGRATED GAS BAG

The present invention relates to a steering wheel having a skeleton provided with a foamed sheathing, a hub, spokes and a steering wheel rim, and including a gas bag module which is inserted in a central recess of the steering wheel, with a cover cap at the side facing the driver.

BACKGROUND OF THE INVENTION

Numerous proposals have already been made for securing a gas bag module in a steering wheel. When steering wheels in the final assembly are secured by means of a nut screwed to the end of the steering column, the gas bag module cannot be inserted until the steering wheel has been fitted since the module is located centrally above the steering wheel hub which must remain freely accessible for screwing on the nut. Alternatively, when the steering wheel is furnished with the completely assembled gas bag and is mounted to the steering column, then some other means of securing the steering wheel is needed. For this, proposals have already been made as well, but all of which are more expensive in design and thus more costly than the usual solution of securing the steering wheel by a central nut.

If the gas bag cover is to be used for actuating the horn switch, the gas bag module needs to be shiftably arranged in the steering wheel, allowing for a contact stroke parallel to the steering wheel axis.

With many mounting systems for gas bag module in a steering wheel, it is a nuisance that the cover cap on the side facing the driver may be positioned relative to the surface of the steering wheel only with considerable complication such that movement gaps existing between the cover cap and the steering wheel, as needed for actuating the horn switch, are equally wide, because between any fastening points at which bolts are inserted and these portions in which movement gaps are provided, a plurality of components is arranged whose inevitable production tolerance in the worst case add up, resulting in significantly differing wide movement gaps. This is unacceptable in terms of a neat appearance.

An object of the invention is to provide a steering wheel with a fastening means permitting to maintain any movement gaps within close tolerances, using conventional bolt connections to reduce production cost, and without necessitating additional space.

To achieve this object it is proposed in accordance with the invention that mounting studs are provided which extend parallel to the steering wheel axis. The positioning of these studs is defined and determined by a foamed sheathing which covers the steering wheel rim and at least part of the spokes. The cover cap has recesses wherein free ends of the mounting studs are slidingly received.

BRIEF SUMMARY OF THE INVENTION

In this arrangement it is assumed that the constructional alignment coordinates, for correctly positioning the cover cap relative to the steering wheel surface, need to be provided as near as possible to the movement gaps and where possible in the same component which in conjunction with the cover cap itself is responsible for the width of the movement gap to be judged by appearance only. This is the foamed sheathing applied to the steering wheel. When in accordance with the invention the portions juxtaposing the cover cap are produced in the same mold and in the same step of production as the coordinates determining the positioning, then the production tolerances may be reduced to such an extent that they are no longer able to influence the movement gaps.

The mounting studs to be used in accordance with the invention are accordingly positioned in the foamed sheathing and so precisely determine the positioning of the cover cap which in turn is attachable to the mounting studs by the guide recesses in the cover cap. It will readily be appreciated that the movement gaps may be very closely tolerated in this way, particularly when the mounting studs are arranged directly juxtaposing the movement gaps where possible.

The gas bag module may be preassembled with the cover cap via the mounting studs and then inserted together with the cover cap in the steering wheel already arranged in the vehicle. Subsequently, all that is needed is to tighten the studs on the rear side of the steering wheel, this corresponding to the present scope of work in fitting bolt connections.

BRIEF DESCRIPTION OF THE DRAWINGS

Further details of the invention will now be discussed by way of embodiments illustrated in the drawings, wherein.

DETAILED DESCRIPTION OF THE INVENTION

Figure 1:
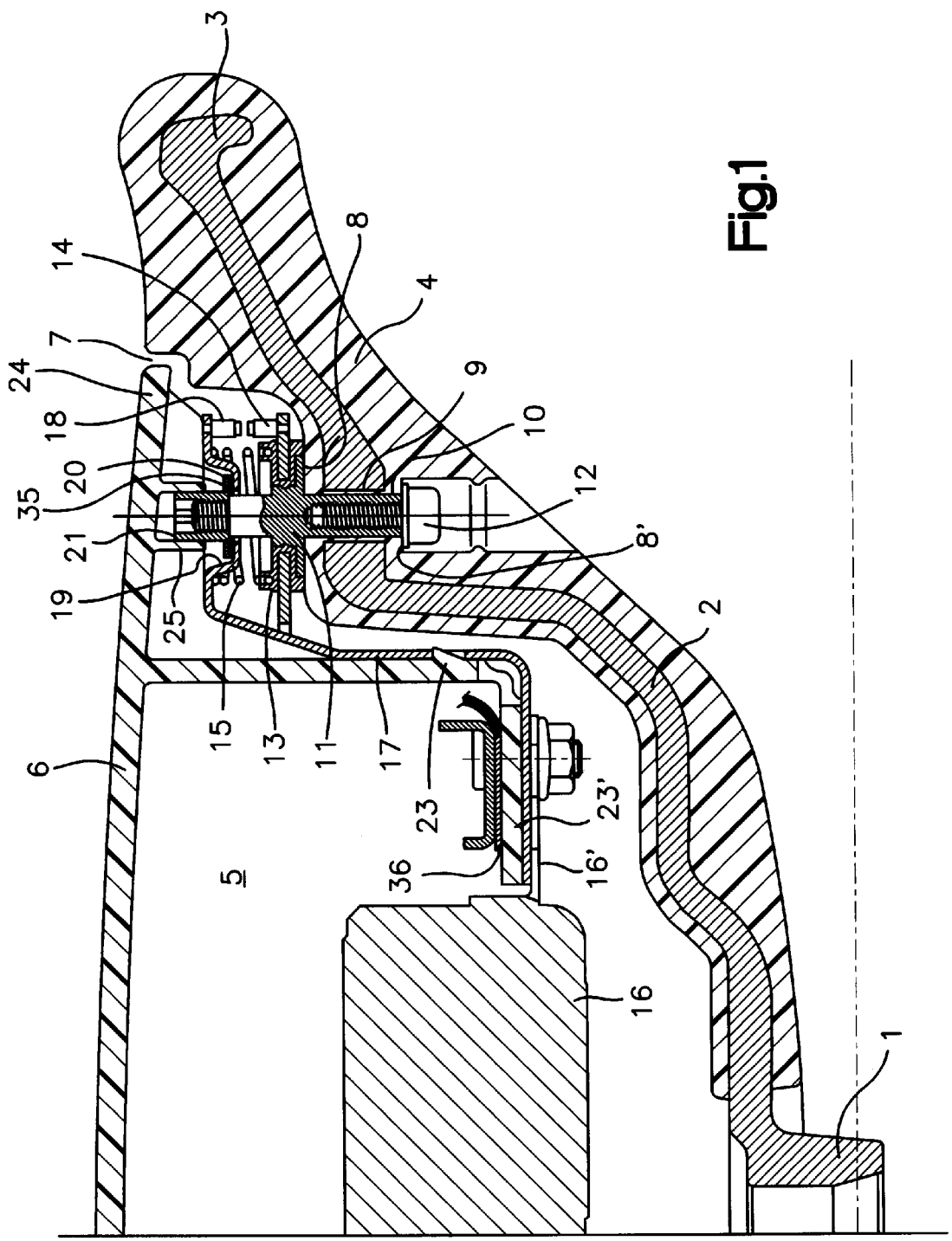
FIG. 1 is a partial section through a steering wheel incorporating a first embodiment of the gas bag module mounting.

Referring now to FIG. 1 there is illustrated a partial section of a steering wheel in which a skeleton consisting of a hub 1, spokes 2 and a steering wheel rim 3 is provided with a foamed sheathing 4. The gas bag module 5 comprising a cover cap 6 at the side facing the driver is inserted in a pot-shaped cavity in the steering wheel, a movement gap 7 being provided between the foamed sheathing 4 and the cover cap 6. For movingly securing the gas bag module 5, mounting studs 10 are provided which extend parallel to the steering wheel axis. The positioning of the mounting studs 10 is defined by the foamed sheathing 4, largish foam-coated through-holes 9 being provided for this purpose in the spokes 2. Provided concentrically to the foam-coated through-holes 9 and on the upper and lower sides of the foamed sheathing 4 are supporting portions 8 and 8' extending in a plane perpendicular to the steering wheel axis. These supporting portions 8, 8' serve as a buttress for the bolt connection, a flange 11 of the mounting stud 10, on the one hand, and the head of a bolt 12, on the other, resting on the supporting portions 8, 8' in the fitted condition. Arranged above the flange 11 is a washer 13 of an insulating material in which a support for the hot electrical contacts 14 is embedded. At the end of the mounting stud 10, at the side facing the driver, a nut 21 is screwed in place, the final fitted positioning of which is defined by a stop on the mounting stud 10. The cover cap is attached to the nut 21 by means of a guide recess 25. In turn, the recesses 25 provided on cover cap 6 accommodate the mounting studs 10. Consequently, the positioning of the recesses 25 is indirectly defined by the sheathing 4. The nut 21 is secured onto the male-threaded end of the mounting stud 10 facing the driver.

Clamped in place between the nut 21 and the washer 13 of insulating material is a helical spring 15 and the dished recess 19 of a mounting tab 17 of the gas bag module 5.

Secured to the mounting tab 17 is an electrical mass contact 18. Additionally arranged between the nut 21 and the dished recess 19 of the mounting tab 17 is a washer 35 of noise-dampening material.

In the embodiment shown the gas bag module 5 comprises an inflator 16 with a mounting flange 16' to which the gas bag 36 is secured via a mounting ring (not shown). By means of the same fasteners an inwardly angled tab 23' of a surrounding web 23 of the cover cap 6 and the mounting tab 17 are secured. Gas bag module 5 and cover cap 6 thus form an assembly unit which is positioned relative to the foamed sheathing 4 via the guide recess configured in the cover cap 6. The dished recess 19 of the mounting tab 17 comprises for this purpose a through-hole 20, the diameter of which is larger by the required clearance than the outer diameter of the mounting stud 10. Reference numeral 24 identifies the outer portion of the cover cap 6, i.e. the portion forming together with the foamed sheathing 4 the movement gap 7 in the fitted condition.

The assembly consisting of gas bag module 5 and cover cap 6 is positioned in a plane perpendicular to the steering wheel axis by the mounting stud 10 relative to the steering wheel whilst being arranged such that for actuating the horn switch contacts 14 and 18, it may be depressed parallel to the steering wheel axis and against the resistance of the return spring 15. For fitting the assembly unit consisting of gas bag module 5 and cover cap 6, the mounting studs 10 are inserted into the foam-coated through-holes and secured to the steering wheel via the bolts 12, the foamed sheathing 4 being configured such that the bolts are unable to drop out downwards even when totally screwed out of the threaded bore of the mounting stud.

Figure 2:
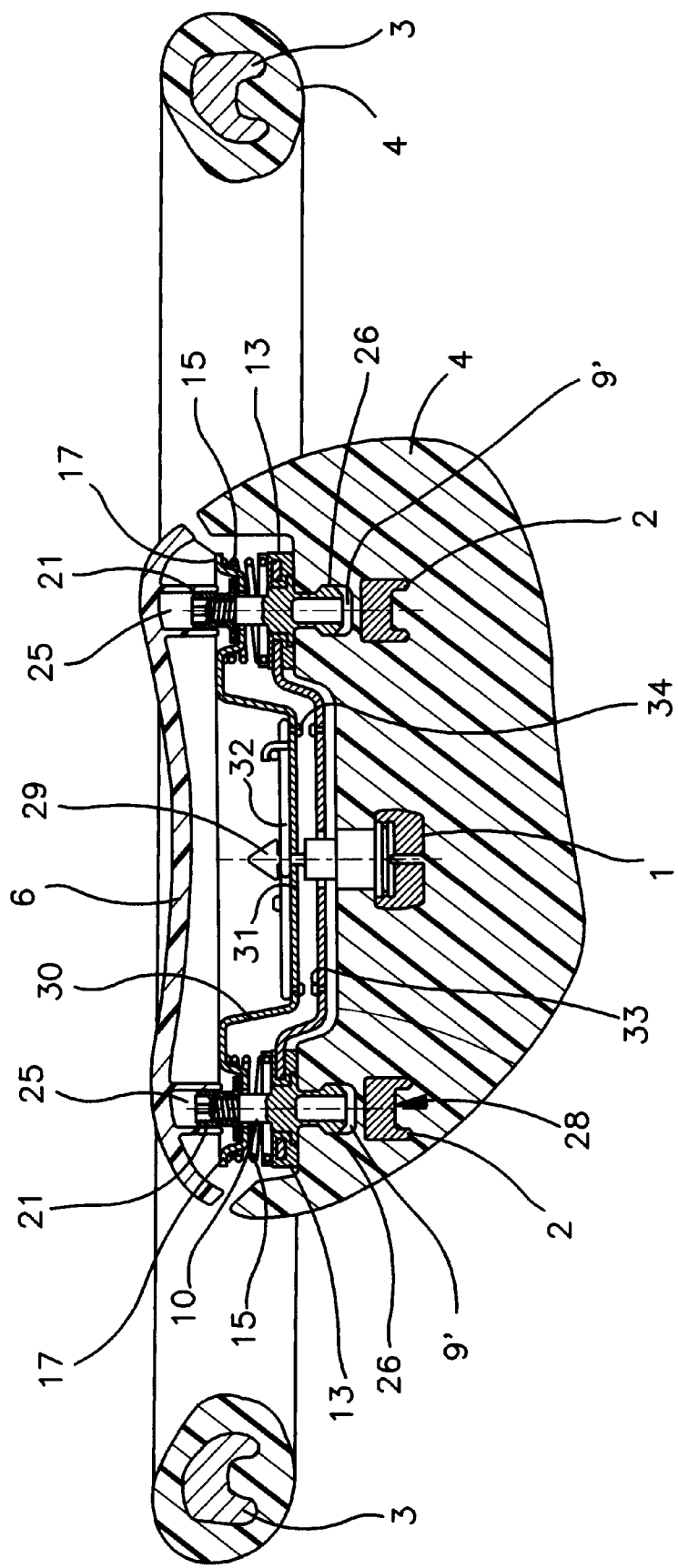
FIG. 2 is a section through a steering wheel incorporating a second embodiment of the gas bag module mounting.

Referring now to FIG. 2 there is illustrated an embodiment employing similar mounting studs 10 including a thickened portion 26 at one end which in the fitted condition engages blind holes 9' in the foamed sheathing 4. In this arrangement two mounting studs 10 each are connected to a plate 28 through washers 13 of an insulating material such that any clearance needed for positioning the mounting studs 10 in the foamed sheathing 4 is maintained.

The plate 28 carries the hot electrical contacts 33 whilst the mass contacts are carried by a mounting plate 30 secured to the gas bag module. The mounting plate 30 is, the same as in the embodiment as shown in FIG. 1, provided with mounting tabs 17 which for actuating the horn switch contacts may be depressed parallel to the steering wheel axis or may be tilted. The cover cap 6 is, here again, attached by means of guide recesses 25 to the nuts 21 screwed onto the mounting studs 10, at the side facing the driver.

Unlike the embodiment as shown in FIG. 1, however, here in FIG. 2 a snap-in or latch-type connection is provided, comprising for two fastening points each a snap-action stud 29 extending in the direction of the steering wheel axis and a latching pawl secured to the mounting plate 30. The snap-action stud 29 is secured by its rear end in a skeleton part 1 of the steering wheel and provided by known ways and means with a conical front end, it being by this end that the snap-action stud 29 is able to pass through a through-opening 31 in the mounting plate 30 to engage behind a latching pawl 32 in the finished fitted condition. By means of such a snap-in or latch-type connection the time needed for final assembly of the gas bag module may, of course, be further reduced as compared to a bolt connection.

It is understood that components in the scope of the description relating to FIG. 2 and not identified by reference numerals are the same in configuration and function as those already described regarding the embodiment as shown in FIG. 1.

Figure 3:
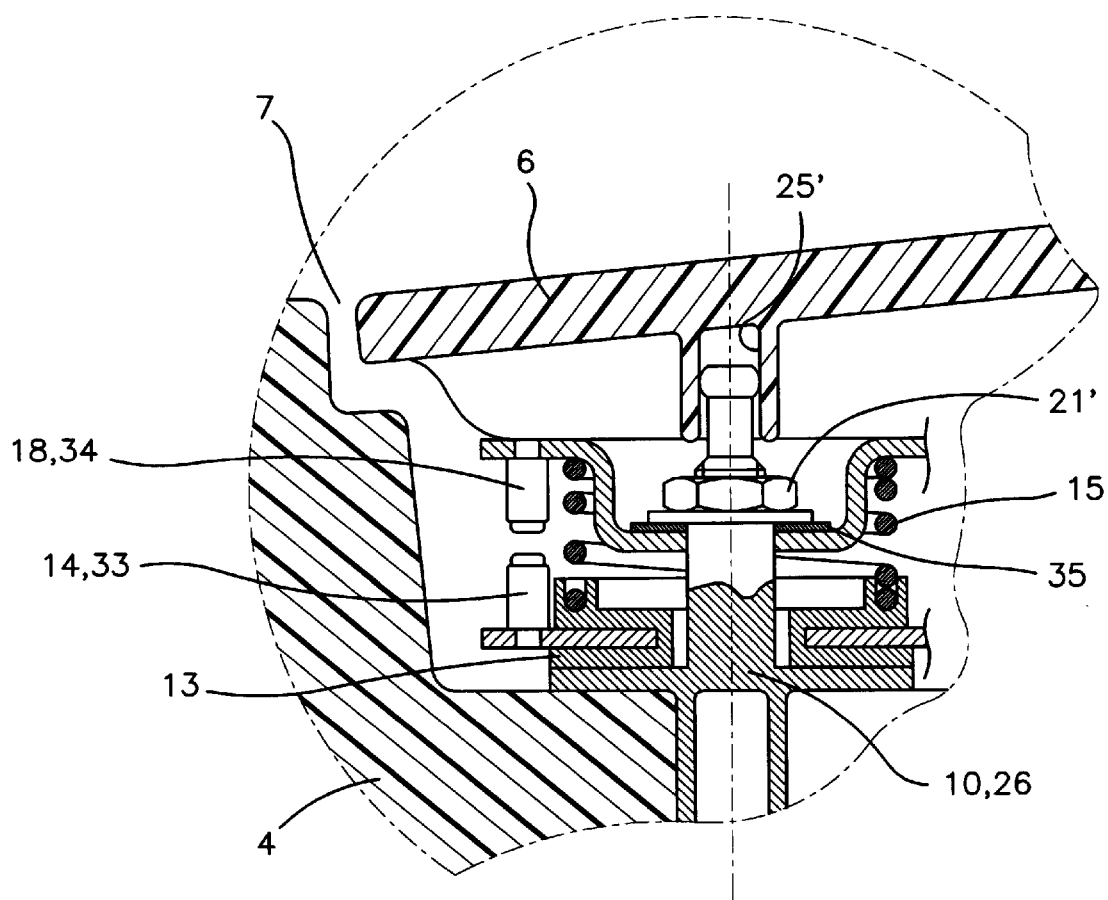
FIG. 3 illustrates a variant of the embodiments as shown in FIGS. 1 and 2 as regards the attachment region of the cover cap.

Referring now to FIG. 3 there is illustrated a variant which differs from the embodiments as shown in FIGS. 1 and 2 merely by the cover cap 6 with a guide recess 25' being directly attached to the end, at the side facing the driver, of the mounting stud 10, 26 and not to the nut 21'. In this way it is prevented that the unavoidable thread clearance between the nut 21' and the mounting stud 10, 26 influences the movement gap 7 between cover cap 6 and foamed sheathing 4.

It is evident from the magnified illustration as shown in FIG. 3 that between the outer limitation of the mounting stud 10, 26 and the surrounding component a radial clearance is provided so that this component cannot obstruct orienting the cover cap 6 relative to the foamed sheathing 4 in a plane perpendicular to the steering wheel axis. Thus, there is provided a way of securing a gas bag module in a steering wheel, in which the cover cap may be precisely oriented in a plane perpendicular to the steering wheel axis, the cover cap, however, being arranged movable and parallel to the axis for actuating the horn contacts.

In the embodiment as shown in FIG. 1 the mounting studs are designed such that they are able to take up the reaction forces occurring on actuation of the gas bag, they being made of steel or some other high-tensile material. In the embodiment as shown in FIG. 2 the reaction forces are taken up by the snap-in or latch-type connections, so that the mounting studs as regards their strength need to be designed merely for positioning the cover cap relative to the steering wheel. For these purposes they may be made of suitable synthetic materials, thus making for an additional weight-saving as compared to the embodiment as shown in FIG. 1.

What is claimed is:

1. A steering wheel having a skeleton, said steering wheel comprising:

a hub, a plurality of spokes, a steering wheel rim; and a foamed sheathing surrounding at least said steering wheel rim and part of said spokes; and a gas bag module having a cover cap being provided in said steering wheel, said gas bag module being movable relative to the skeleton for actuation of a horn switch, an apparent gap being formed between said cover cap and said foamed sheathing, said gas bag module being movably secured in said steering wheel by a plurality of mounting studs having free threaded ends projecting toward said cover cap, said cover cap having recesses aligned with said mounting studs for accommodation of said free ends of said mounting studs; and said sheathing having a first portion engaging said skeleton and a second portion engaging said mounting studs and locating said cover cap recesses, said first portion and said second portion providing the positional relationship between said skeleton, said mounting studs, and said cover cap recesses, through-holes being provided in said skeleton, said foamed sheathing providing supporting areas around said through-holes on two opposite sides, said supporting areas forming buttresses for said mounting studs and for bolts cooperating with said mounting studs, respectively.

2. The steering wheel as set forth in claim 1, wherein said supporting areas extend in parallel planes perpendicular to a steering wheel axis.

3. The steering wheel as set forth in claim 2, wherein said mounting studs extend through said through-holes, each mounting stud having a flange which bears on one of said supporting areas.

4. The steering wheel as set forth in claim 3, wherein each of said mounting studs has a rear end with a female thread for attachment to said steering wheel by means of a bolt, each bolt having a bolt head which bears on one of said supporting areas.

5. The steering wheel as set forth in claim 1, wherein at least one of said mounting studs carries a washer of an insulating material, said washer having an electrical contact mounted thereon.

6. The steering wheel as set forth in claim 5, wherein said gas bag module is provided with mounting tabs comprising curved recesses with through-holes for said mounting studs, return springs being arranged between said washers of insulating material and said mounting tabs, said return springs being preloaded by nuts screwed onto male-threaded ends of said mounting studs.

7. The steering wheel as set forth in claim 6, wherein at least one of said curved recesses and said washers of insulating material serve to guide said return springs, formed as helical springs.

8. The steering wheel as set forth in claim 5, wherein mass contacts are formed in the region of said curved recesses.

9. The steering wheel as set forth in claim 6, wherein washers of a noise-dampening material are inserted between said nuts and said curved recesses.

10. The steering wheel as set forth in claim 6, wherein said nuts are configured for attachment of said recesses of said cover cap.

11. The steering wheel as set forth in claim 6, wherein said mounting studs have front ends protruding beyond said nuts and are shaped for attachment of said recesses of said cover cap.

12. The steering wheel as set forth in claim 6, wherein said mounting tabs are provided on a mounting plate having a central through-hole for a snap-action stud extending in a direction of a steering wheel axis and adapted to be engaged by a latching pawl provided on said mounting plate, said snap-action stud having an end attached to said skeleton.

13. The steering wheel as set forth in claim 1, wherein each of said mounting studs has a rear end accommodated in a blind hole formed in said foamed sheathing, and a flange bearing on a supporting area on said foamed sheathing, said supporting area extending in a plane perpendicular to a steering wheel axis.

14. The steering wheel as set forth in claim 13, wherein the rear ends of said mounting studs each engage a widened portion of the blind holes by means of a thickened portion.

15. The steering wheel as set forth in claim 1, wherein said mounting studs are carried by a plate mounted between washers of an insulating material, said plate being provided with electrical contacts, and said mounting studs being connected to said plate in a manner to permit alignment of said mounting studs in said foamed sheathing.

16. The steering wheel as set forth in claim 13, wherein mass contacts are arranged opposite said electrical contacts on said mounting plate.

17. The steering wheel as set forth in claim 1, wherein said mounting studs have female threads for receiving said bolts and male threads for securing corresponding nuts.

18. A steering wheel having a skeleton, said steering wheel comprising:

a hub, a plurality of spokes, a steering wheel rim; and a foamed sheathing surrounding at least said steering wheel rim and part of said spokes; and a gas bag module having a cover cap being provided in said steering wheel, said gas bag module being movable relative to the skeleton for actuation of a horn switch, an apparent gap being formed between said cover cap and said foamed sheathing, said gas bag module being movably secured in said steering wheel by a plurality of mounting studs having free threaded ends projecting toward said cover cap, said cover cap having recesses aligned with said mounting studs for accommodation of said free ends of said mounting studs; and the positional relationship between said skeleton, said mounting studs, and said recesses being determined by said foamed sheathing, each of said mounting studs having a rear end with a female thread for attachment to said steering wheel by means of a bolt.

19. The steering wheel as set forth in claim 18, wherein said mounting studs have male threads for securing nuts in said cover cap recesses.

* * * * *